United States Patent
Saboune et al.

(10) Patent No.: US 9,946,348 B2
(45) Date of Patent: Apr. 17, 2018

(54) AUTOMATIC TUNING OF HAPTIC EFFECTS

(71) Applicant: Immersion Corporation, San Jose, CA (US)

(72) Inventors: Jamal Saboune, Montreal (CA); William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 35 days.

(21) Appl. No.: 14/661,396

(22) Filed: Mar. 18, 2015

(65) Prior Publication Data
US 2015/0268723 A1 Sep. 24, 2015

Related U.S. Application Data

(60) Provisional application No. 61/968,419, filed on Mar. 21, 2014.

(51) Int. Cl.
*G06F 3/01* (2006.01)
*G11B 27/10* (2006.01)
*G11B 27/038* (2006.01)

(52) U.S. Cl.
CPC ............ *G06F 3/016* (2013.01); *G11B 27/038* (2013.01); *G11B 27/10* (2013.01)

(58) Field of Classification Search
CPC . G06F 3/01; G06F 3/011; G06F 3/014; G06F 3/016
See application file for complete search history.

(56) References Cited

U.S. PATENT DOCUMENTS

| | | | |
|---|---|---|---|
| 2008/0294984 A1 | 11/2008 | Ramsay et al. | |
| 2009/0096632 A1* | 4/2009 | Ullrich | H04N 9/8205 340/4.21 |
| 2009/0189748 A1* | 7/2009 | Bergere | H04R 1/1091 340/407.1 |
| 2013/0038603 A1* | 2/2013 | Bae | G06F 3/016 345/419 |
| 2014/0176415 A1* | 6/2014 | Buuck | G06F 3/016 345/156 |

FOREIGN PATENT DOCUMENTS

| EP | 2703951 A2 | 3/2014 |
|---|---|---|
| EP | 2846549 A1 | 3/2015 |

OTHER PUBLICATIONS

Hasti Seifi et al., "End-user Customization of Affective Tactile Messages: A Qualitative Examination of Tool Parameters", 2014 IEEE HAPTICS Symposium (HAPTICS), Feb. 23, 2014, pp. 251-256, XP032582571.

Colin Swindells et al., "Medium Fidelity Rapid Prototyping of Vibrotactile Haptic, Audio and Video Effects", 2014 IEEE HAPTICS Symposium (HAPTICS), Feb. 23, 2014, pp. 515-521, XP032582526.

\* cited by examiner

*Primary Examiner* — David Tung
(74) *Attorney, Agent, or Firm* — Miles & Stockbridge P.C.

(57) ABSTRACT

A system that generates haptic effects receives input media that includes audio data, video data, or sensory data. The system automatically generates a haptic effect track from the input media. The system then applies at least one filter to the automatically generated haptic effect track to generate a tuned haptic effect track.

26 Claims, 7 Drawing Sheets

AUTOMATIC TUNING OF HAPTIC EFFECTS

CROSS REFERENCE TO RELATED APPLICATIONS

This application claims priority of Provisional Patent Application Ser. No. 61/968,419, filed on Mar. 21, 2014, the contents of which is hereby incorporated by reference.

FIELD

One embodiment is directed generally to haptic effects, and more particularly, to a device that automatically generates and tunes haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as games or other media, so that the haptic effects are incorporated into the other content. For example, in a gaming context, when a game is developed, an audio effect developer can develop audio effects that are associated with the game and represent an action occurring within the game, such as machine gun fire, explosions, or car crashes. Typically, haptic effects are added to the game late in the game development process, such as when the game developer is finishing development of the game application, or when the game developer ports the finished game application to a new platform. This generally results in the phenomena where haptic effects are added after all the audio effects have been developed. Because haptic effects are typically added so late in the process, it generally falls on the haptic effect developer, or some other developer, to make a decision regarding associating a haptic effect with an audio effect. Further, an audio effect developer typically does not have input regarding a selection of an appropriate haptic effect for an audio effect. This can contribute to a degradation of the quality of haptic effects that are ultimately incorporated into the content. This quality degradation can be a barrier to incorporating high-quality haptic effects into such content.

SUMMARY

One embodiment is a system that generates haptic effects. The system receives input media that includes audio data, video data, or sensory data. The system automatically generates a haptic effect track from the input media. The system then applies at least one filter to the automatically generated haptic effect track to generate a tuned haptic effect track.

DETAILED DESCRIPTION

One embodiment is a system that automatically generates and tunes/filters one or more haptic effects given source data, such as audio or video source data or any sensory data related to the content of the multimedia clip (e.g., accelerations of objects, rotations, speed, etc.). Embodiments can automatically convert received source data into haptic information, and then perform the tuning or filtering to adjust the automatically generated output to account for user preferences, localization (i.e., based on regional preferences), output device parameters, etc. The filtering can also be applied to haptic effects that have been authored. Therefore, the quality of the haptic effects is improved.

Figure 1:
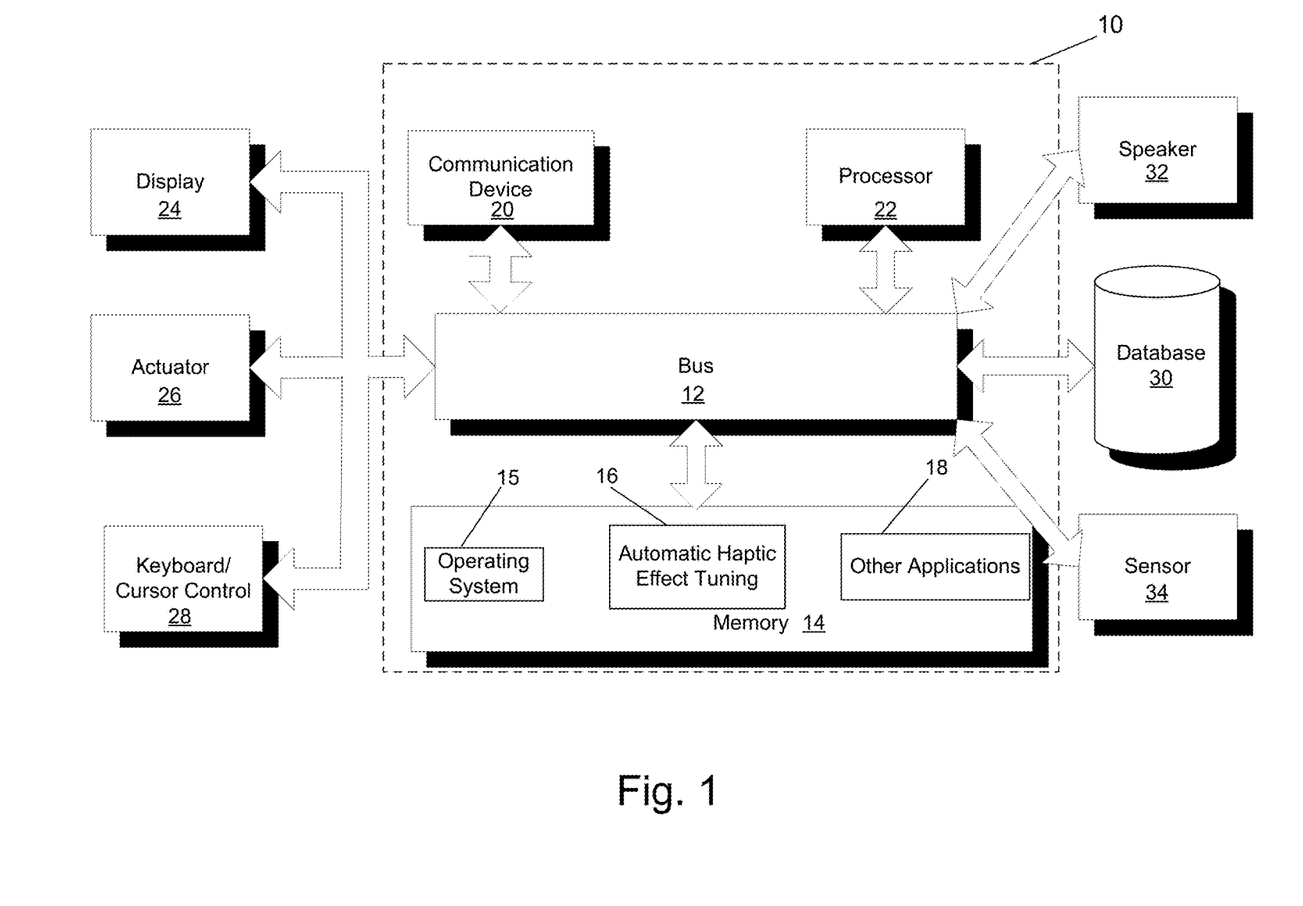
FIG. 1 illustrates a block diagram of a system in accordance with one embodiment of the invention.

FIG. 1 illustrates a block diagram of a system 10 in accordance with one embodiment of the invention. In one embodiment, system 10 is part of a device, and system 10 provides an automatic haptic effect tuning functionality for the device. In another embodiment, system 10 is separate from the device, and remotely provides the automatic haptic effect tuning functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a device in one embodiment. The modules further include an automatic haptic effect tuning module 16 that automatically tunes a haptic effect, as disclosed in more detail below. In certain embodiments, automatic haptic effect tuning module 16 can include multiple modules, where each individual module provides specific individual functionality for automatically tuning a haptic effect. For example, automatic haptic effect tuning module 16 may include a conversion module that receives media comprising at least one of audio or sensory data, and automatically generates a haptic effect track from the media. Automatic haptic effect tuning module 16 may also include a filtering module that applies at least one selectable filter to the automatically generated haptic effect track to generate a tuned haptic effect track. System 10 will typically include one or more additional application modules 18 to include additional functionality, such as the "Integrator" application by Immersion Corp., which automatically generates corresponding haptic effects from audio/visual input.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. Display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic effect signals to that device through communication device 20.

System 10 can further be operatively coupled to a database 30, where database 30 can be configured to store data used by modules 16 and 18. Database 30 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 further includes one or more speakers 32. Processor 22 may transmit an audio signal to speaker 32, which in turn outputs audio effects. Speaker 32 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

System 10, in one embodiment, further includes a sensor 34. Sensor 34 can be configured to detect a form of energy, or other physical property, such as, but not limited to, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 34 can further be configured to convert the detected energy, or other physical property, into an electrical signal, or any signal that represents virtual sensor information. Sensor 34 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, or a light-dependent resistor.

In general, automatic haptic conversion algorithms that generate haptic effects from sensory multimedia data, including audio and/or video data, lack the human artistic touch that can improve the quality of created haptic effects by tuning and tweaking. Embodiments inject some of this expert knowledge into the automatic conversion workflow when possible, using a variety of filtering/tuning techniques.

Embodiments can perform the tuning as part of the auto-conversion process, or be available as selectable filters that a user can select after the haptic effects have been automatically generated. In one embodiment, the filters are applied to the haptic effect track, such as a pulse-code modulation ("PCM") signal with samples of values −1 to +1. In one embodiment, the available filters, disclosed in more detail below, include: "emphasize bumps", "emphasize last", "scenes blending", "dynamic range compression/expansion", "actuator capability", "object of interest", "background/foreground" and "proximity to action" filters. In one embodiment, some or all of the available filters can be implemented concurrently when the haptic effects are automatically generated, so that the output of the filters are selectable and are then "instantly" available.

Figure 2:
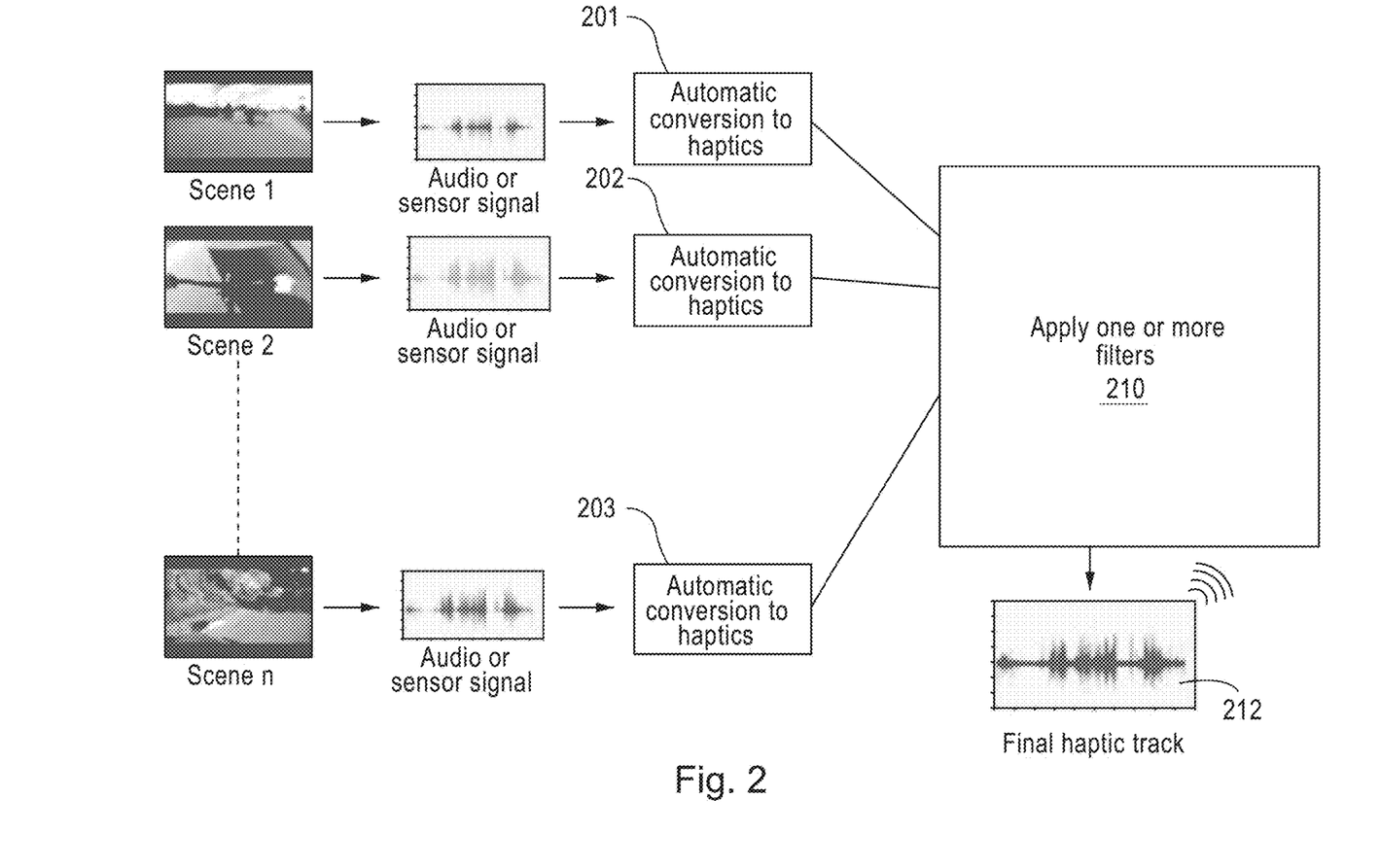
FIG. 2 is a block diagram of a system that receives multimedia scenes, including audio, video and any sensory related data (e.g., acceleration, rotation, speed, etc.), automatically converts the scenes related data into haptic effects, and then tunes/filters the haptic effects in accordance with embodiments of the invention.

FIG. 2 is a block diagram of a system that receives multimedia scenes, including audio, video and any sensory related data (e.g., acceleration, rotation, speed, etc.), automatically converts the scenes related data into haptic effects, and then tunes/filters the haptic effects in accordance with embodiments of the invention. In FIG. 2, audio, video and/or sensor signals from various scenes 1-n of multimedia data are automatically converted at 201-203 to haptic effects using known systems and methods. One known system and method for automatic conversion is disclosed in U.S. patent application Ser. No. 13/785,166, the disclosure of which is herein incorporated by reference. In general, an automatic conversion algorithm analyzes the sensory data or audio data signals, and identifies some features such as envelope, frequency content, peaks, noise, etc., and then creates a haptic track based on these features.

At 210, one or more filters are applied to the automatically converted haptic effects. The filters can be preselected and automatically applied, or can be applied to the generated haptic track at any time after the automatic conversion. For example, a list of available filters can be presented to a user in a pull-down menu of a user interface, and the user can select one or more filters to apply. When multiple filters are selected, they can be pipelined and applied in any selected or predefined order. The filter or filters, after applied, produce a final haptic effects track 212.

In one embodiment, with multiple filters, the filters can be applied in sequence, for example, filter1, then filter2, etc., where filter1 takes as input the original haptic track and outputs a new haptic track that is fed to filter2 as input, and so on, until the final haptic effects track is output at 212. The order/sequence that the filters are applied may change the resultant input. For example, if the order in one embodiment is filter1, filter2 and filter3, and the order in another embodiment is filter2, filter1 and filter3, the final haptic effects track may differ even though the same three filters are applied in sequence in both examples.

In one embodiment, with multiple filters, the filters can be applied in parallel, where filter1, filter2, etc., all have as input the same original haptic track, and the output of each of the filters is then fed as inputs to a summation filter that outputs the final haptic effects track at 212. The summation filter can include a weighted sum scheme where the weight of each input can be assigned by the user or assigned automatically (i.e., pre-defined values). In another embodiment, all of the weights are equal (i.e., assigned automatically without the user's intervention). For example, if there are five filters applied in parallel, each output track will be multiplied by a weight of 0.2 (=1/5) in the summation filter.

Further, in one embodiment, with multiple filters, a "hybrid" mode can be implemented, where some filters can be applied in sequence and the output of multiple sequence can have filters applied to it in parallel. For example, filter1, filter3 and filter4 can be applied in sequence to form sequence1. Filter2, filter3 and filter5 can be applied in another sequence to form sequence2. The outputs of sequence1 and sequence2 can then be fed to a summation filter to output the final haptic effects track at 212.

In embodiments, the input of any of the filters, or any sequence of filters, or any parallel application of filters, can be one of the originally converted haptic track, the output of any filter, the output of any sequence of filters, or the output of any parallel application of filters.

With multiple filters, the choice of filters and the application mode (i.e., in parallel or in sequence) are based on the user's design style/taste and can change for portions of a media clip. For example, in the first five minutes, filters 1 to 5 can be applied in sequence, in the next two minutes, filters 2 and 3 can be applied in parallel, etc. Each of the filters can be applied with different parameters depending on the user's style/taste (e.g., an advanced user mode), or can be applied with default parameters (i.e., no user intervention).

In one embodiment, one available filter is the "emphasize bumps" filter that gives more importance to short sharp but intense effects (i.e., "bumps") related to an important or relevant event by reducing the magnitude of the effects preceding it, as well as immediately after, sometimes with a short fade into the successive effect. In order to give bumps more importance, there is a need for the bumps to feel different than the closely preceding effects. Embodiments lower the intensity/magnitude of the effects closely preceding a "bump". Embodiments find the bumps within the haptic track by, for example, finding the samples of the haptic track having an absolute value greater than a certain threshold, or the "bump threshold" (e.g., 0.9). Once a "bump" is found, embodiments look at the samples of the haptic track representing a "lookup window" of time before it (e.g., 500 ms). In these samples, the blocks of consecutive samples are found with absolute values smaller than a certain threshold, or "elimination threshold" (e.g., 0.3) and covering a time greater than a certain threshold, or "elimination duration threshold" (e.g., 50 ms). These samples are then nullified (i.e., magnitude values lowered to 0).

In one embodiment, one available filter is the "emphasize last" filter. In general, the last haptic effect in a clip/track should usually be intense in order to mark the end of the clip, and therefore it should be automatically emphasized (e.g., higher magnitude). Therefore, the "emphasize last" filter finds the last effect in a haptic track and amplifies its magnitude. This can be achieved by multiplying the last effect's sample values by a gain factor greater than 1 (e.g., 1.5). Embodiments first find the sample in the haptic track representing the last effect end (i.e., the last sample of the last effect). To do so, the last sample in the track with an absolute value bigger than a certain threshold, or "silence threshold" (e.g., 0.1) is found. Embodiments then find the start of the last effect (i.e., the first sample of the last effect) by considering all the samples preceding the last effect's end and finding the last block of "haptic silence" in those samples. The last effect's start is the first sample that follows this last "haptic silence". A "haptic silence" is a block of consecutive haptic track samples with absolute values smaller than a certain threshold, or "silence threshold" (e.g., 0.1) and covering a time greater than a certain threshold, or "silence duration threshold" (e.g., 100 ms).

Figure 3:
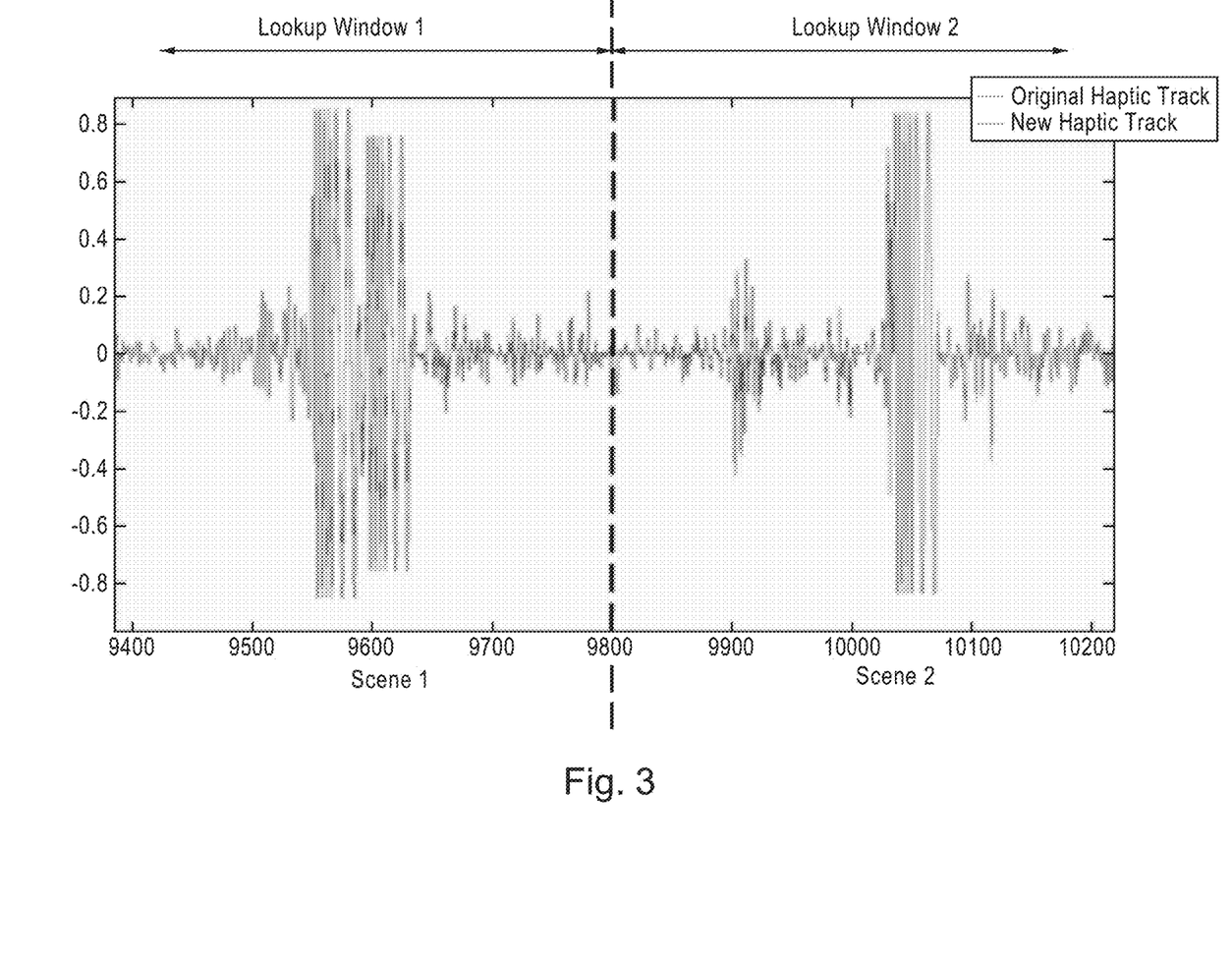
FIG. 3 is a graphical illustration of blending two scenes ("Scene1" and "Scene2") in accordance with one embodiment.

In one embodiment, one available filter is the "scenes blending" filter, which is adapted to let the user feel the transition between one scene and the next scene in a media clip. Embodiments apply a "fade out" strategy to the previous scene haptic track and/or a "fade in" strategy to the current scene haptic track. FIG. 3 is a graphical illustration of blending two scenes ("Scene1" and "Scene2") in accordance with one embodiment. Embodiments emphasize or highlight the transition between the different scenes in a clip by making the related (to each scene) haptic effects distinguishable. Embodiments implement a "fade out" and then "fade in" approach to the filtering.

In one embodiment, the functionality is only applied if:
Both the haptic effects in the last window of time, or the "blending lookup window" (e.g., 500 ms) in the first scene/track, and in the first window of time, or the "blending lookup window" in the following scene/track, are both intense (i.e., haptic samples with max absolute value greater than 0.5 for example in each); or If both effects are light effects (i.e., the haptic samples with a maximum absolute value lesser than 0.5 for example in each) but have close intensity (i.e., a maximum absolute values in each of the two lookup windows differ by only 0.1, for example).

Further, a fade-out filter is applied to the first scene's last "lookup window" of haptic effects ("window1") and a fade-in filter is applied to the following scene's first "lookup window" of haptic effects ("window2") as follows:

Embodiments find the maximum value in the first half of window1 and constructs a signal "signal1" identical to window1 that is then modified in the following way: the samples from the beginning until the maximum value's position will all have a value=1; the following samples (from this maximum sample till the end of signal1) are calculated in a way to have these sample values decrease linearly from the identified maximum value until 0 (at the end of signal1). Window1 samples are then multiplied by signal1 samples (element by element) and the result is injected in the original haptic track instead of window1.

Embodiments then find the maximum value in window2 and construct a signal "signal2" identical to window2 that is then modified in the following way: the samples from the maximum value position until the end of signal2 will all have a value=1; the preceding samples (from the beginning of signal2 until this maximum sample) are calculated in a way to have these samples values increase linearly from 0 (at the beginning of signal2) until the identified max value window2 samples are then multiplied by signal2 samples (element by element) and the result is injected in the original haptic track instead of window2.

In one embodiment, one available filter is the "dynamic range compression/expansion" filter that is adapted to make the weak effects weaker and/or make the strong effects stronger. Embodiments boost the magnitude of intense effects and reduce the magnitude of small amplitude effects. The filter first transforms haptic sample values to a logarithmic scale (in decibels dB). All the haptic samples with values greater than a certain threshold "thr1" (e.g. −30 dB) will have a new value calculated using a gain value "gain" (e.g., 1.5) calculated as follows:

new_value=((old_value−$thr1$)*gain)+$thr1$.

All the haptic samples with values lesser than a certain threshold "thr2" (e.g., −50 dB) will have a new value calculated using an attenuation value "att" (e.g., 2) calculated as follows:

new_value=$thr2$−(($thr2$−old_value)*$att$).

In one embodiment, one available filter is the "actuator capability" filter that filters the automatic generated haptic track to adapt for the capability of the actuator(s) in the intended playback device. In general, changes are made to a haptic track by extending or shortening some or all of the elementary haptic effects by a certain pre-defined value (e.g., 10 ms), depending on the device and the quality of the actuator(s) of the playback device. For example, for a texture-based haptic effect, the tuning may include changing the parameter that defines the cycle value (i.e., the length of time the effect plays and time where there is no effect). For example, a textured haptic effect may include 10 ms of effect and 10 ms of silence for the duration of the effect. In one example, the cycle value for a texture-based haptic effect on a "Galaxy S4" smartphone from Samsung Corp. was 10 ms, but on a "G2" smartphone from LG Corp., the effect was better rendered with a cycle value of 25 ms, despite both having an LRA as a haptic output device. For this filter, one input needed is the capabilities of the actuator(s) or other haptic output devices of the playback device, including the type of haptic output devices, the location of the haptic output devices, etc. This can be manually provided, or automatically read from pre-stored values in a look-up table.

In other embodiments, some filters can be applied to tune the generated haptic effects in order to haptically emphasize a specific object's related events in the media clip (i.e., "object of interest"), or instead reduce the importance of these events. This object can be selected by the user/designer in one embodiment, or be automatically detected by the system in another. Another embodiment can also tune the effects given the proximity of the action to the camera. In general, these embodiments are directed to improving an "out of context" problem that sometime occurs with automatically generated haptic effects using sensory data. More specifically, this issue can be clearly observed through the magnitude/intensity of the effects. For example, when deriving haptic effects using data captured from a bike movement in a BMX activity, the automatically generated haptic effects typically have the same magnitude when the bike is close to and when it is far from the camera. As a result, the haptic effects feel less realistic because they do not reflect this notion of proximity.

Further, haptic effects related to an object/action can create confusion for the viewer in the presence of another person/object moving in the video with a closer distance to the camera. This confusion is due to the fact that the viewer perceives the effects as related to the "action" happening in the foreground (the closest to the camera) while in reality they may be derived from the "action" in the background (the farthest from the camera). The solution in this specific case would be to derive the displayed haptic effects from the "foreground action" if possible (i.e., if sensory data is available), and if not, reduce the magnitude of the effects derived from the "background action".

Because the "object of interest, "background/foreground" and "proximity to action" filters are based on video input, computer vision approaches are used in embodiments.

Figure 4:
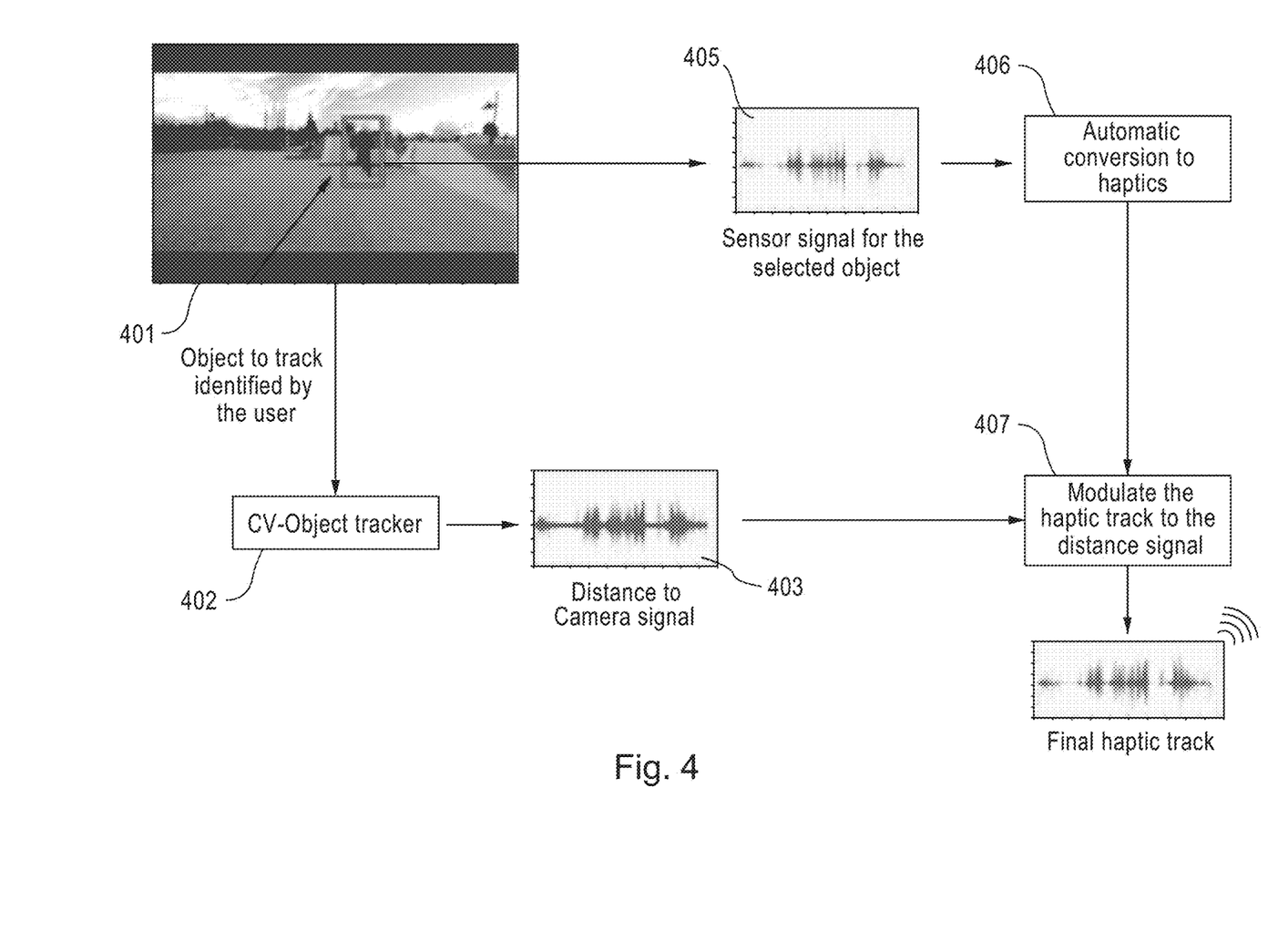
FIG. 4 illustrates computer vision ("CV") tuning implemented by an "object of interest" filter in accordance with one embodiment.

FIG. 4 illustrates computer vision ("CV") tuning implemented by the "object of interest" filter in accordance with one embodiment. In FIG. 4, the user at 401 chooses the object/person (i.e., the object or person considered of interest by the user/designer) that the haptics should be related to by clicking on its two dimensional representation at the beginning of the clip (assuming that sensory data was acquired for this object at 405). A CV algorithm will track this object at 402 in the video and estimate its distance to the camera in each N frames at 403. The haptic effects created for this object at 406 are then modulated (in the N corresponding frames) at 407 to this estimated distance. For example, the effects can be made stronger (i.e., multiply the sample values by a gain factor greater than 1) when the object is close to the camera, or made weaker (i.e., multiply the sample values by a reduction factor less than 1) when the object is far from the camera. The value of the gain/reduction factor can change linearly with the estimated distance to the camera.

The object's tracking is done by tracking visual features related to this object in each frame and estimating its movement. The visual features that can be used include (but are not limited to): color, shape, Scale Invariant Feature Transform ("SIFT"), Speeded Up Robust Features ("SURF"), Histogram of Oriented Gradients ("HOG") descriptor, Haar like features, Shi-Tomasi features and wavelet transform. The tracking can be performed using Optical Flow calculation techniques, Kalman filtering or Particle Filtering approaches.

Figure 5:
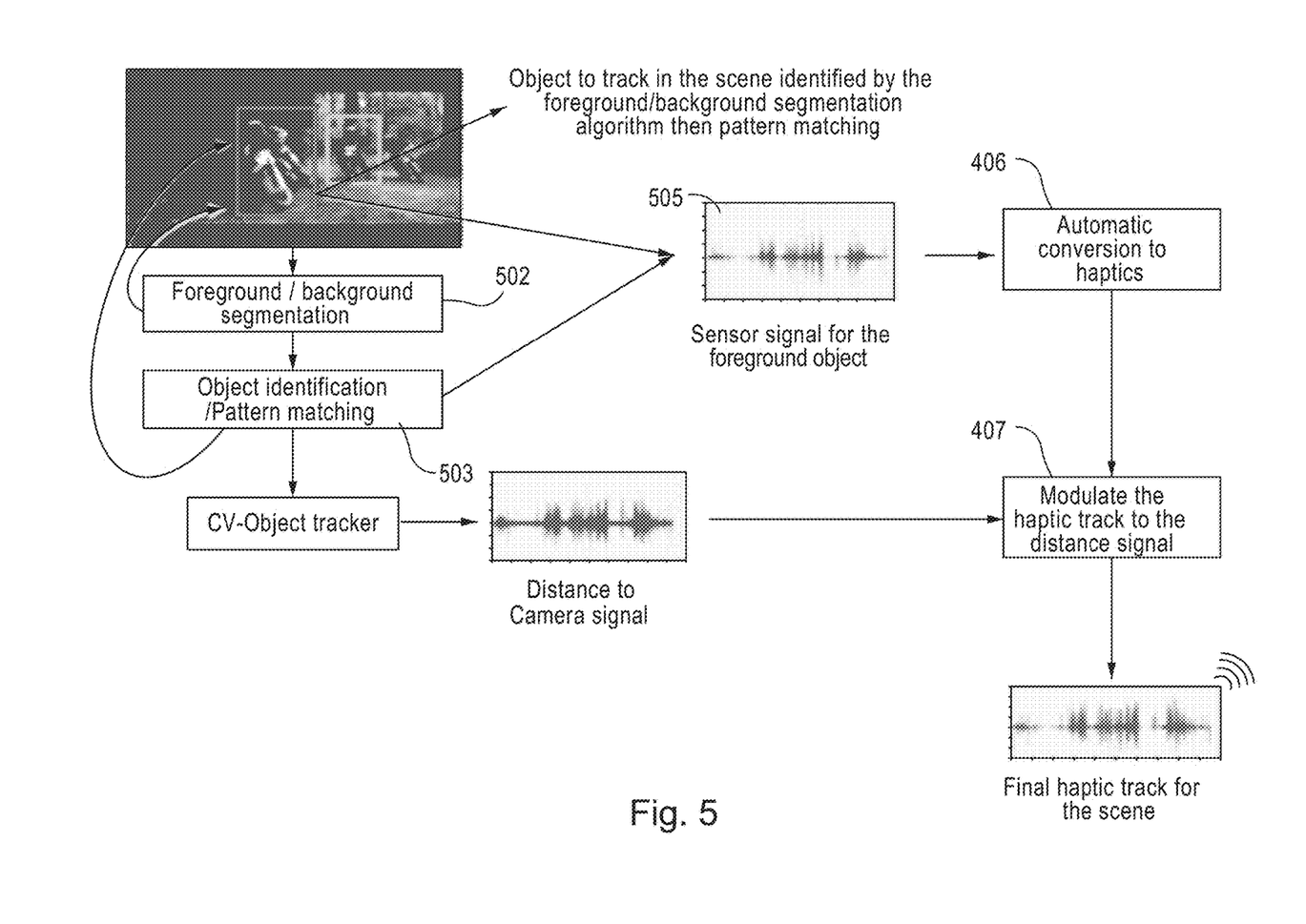
FIG. 5 illustrates CV tuning implemented by a "background/foreground" filter in accordance with another embodiment of the invention.

FIG. 5 illustrates CV tuning implemented by the "background/foreground" filter in accordance with another embodiment of the invention. In FIG. 5, a CV algorithm at 502 autonomously segments the objects in each scene (N frames) into foreground and background action objects/event (i.e., if the object is in the foreground but not moving, it is not taken into account). Another algorithm identifies these objects using pattern matching approaches at 503 and generates a haptic track using the sensory data 505 related to the object identified as in the foreground, if this data is available (labeled with the object type). If not, the haptics are created using the background object's sensory data. The background/foreground filtering can also be applied dynamically. Throughout a media clip, the objects/persons can change positions and therefore the objects/persons in the foreground can be different at different moments. Embodiments can adapt to this constraint and change the haptic effects accordingly. The haptic effects created for the identified object/person can also be tuned based on its distance to the camera as described above. This distance can be inferred from the tracking/identification step.

The matching approach/nature identification of an object is done by detecting the features of the object in the image and then classifying them against features of well-known objects. The features that can be used include (but not limited to): color, shape, Scale Invariant Feature Transform ("SIFT"), Speeded Up Robust Features ("SURF"), Histogram of Oriented Gradients ("HOG") descriptor, Haar like features, Shi-Tomasi features, wavelet transform. The classification can be done using Neural Networks, Support Vector Machines ("SVM"), Adaboost classifiers, Cascade classifiers, K Nearest Neighbors ("KNN") and Bayesian Networks.

Figure 6:
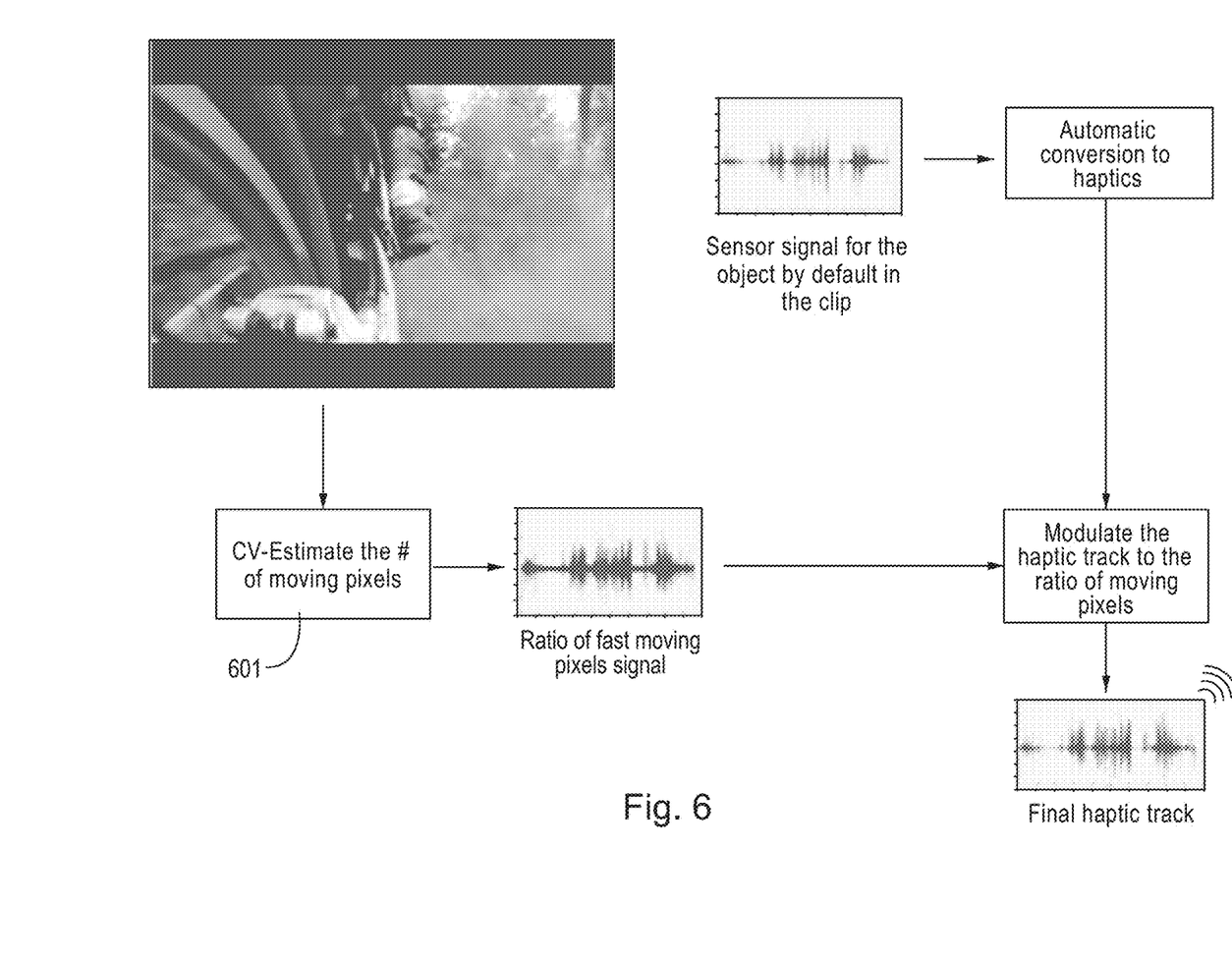
FIG. 6 illustrates CV tuning implemented by a "proximity to action" filter in accordance with another embodiment of the invention.

FIG. 6 illustrates CV tuning implemented by the "proximity to action" filter in accordance with another embodiment of the invention. In FIG. 6, a CV algorithm estimates the proportion of pixels moving fast in each scene (N frames) at 601. If this value is high, the camera is close to the "action" (e.g., a point-of-view ("POV") camera) in the scene, and therefore the generated haptic effects should have a bigger magnitude. If not, the haptic effects should feel weaker. One embodiment uses an optical flow calculation to estimate this proximity.

Figure 7:
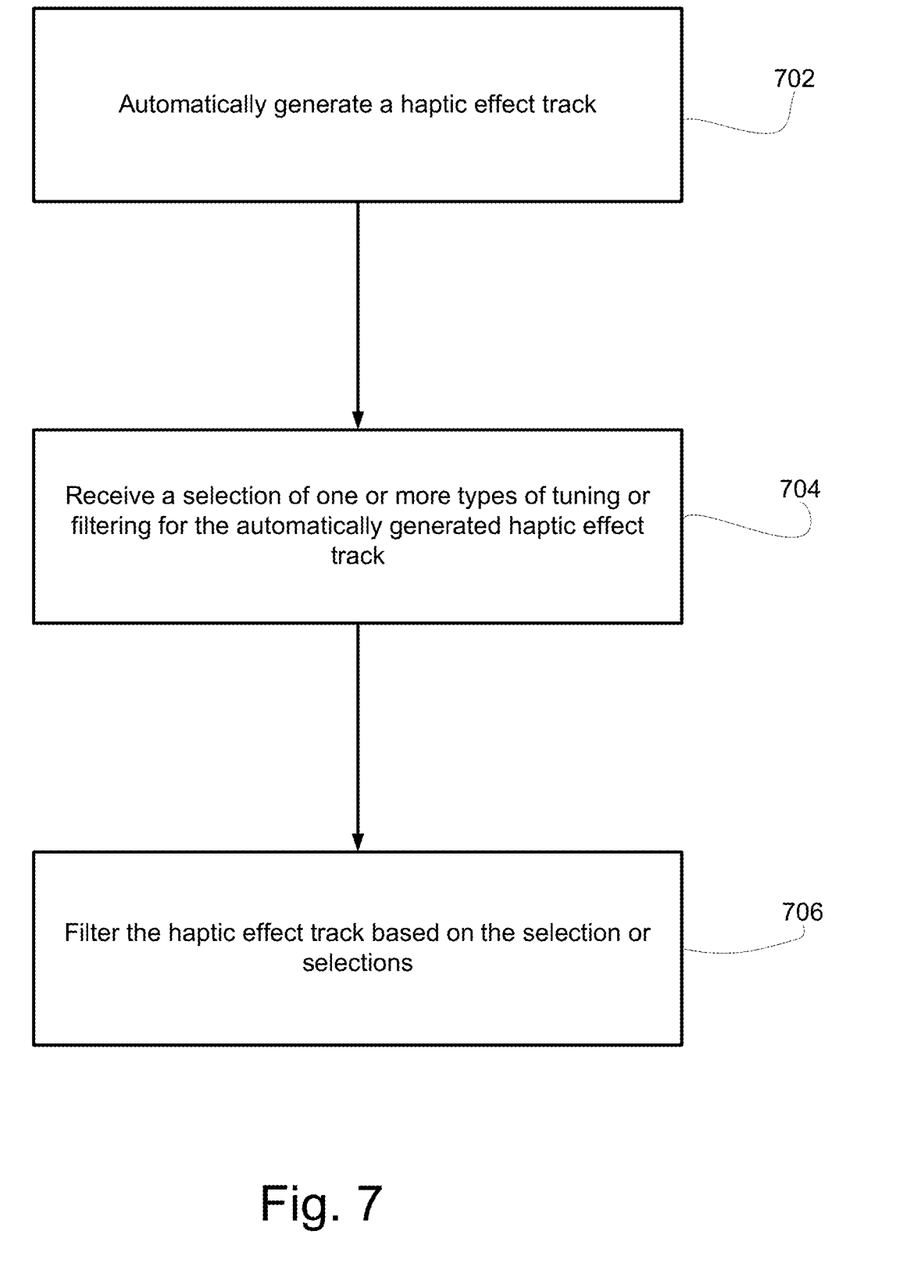
FIG. 7 is a flow diagram of the functionality of the system of FIG. 1 when automatically tuning/filtering a haptic effect track in accordance with an embodiment.

FIG. 7 is a flow diagram of the functionality of system 10 of FIG. 1 when automatically tuning/filtering a haptic effect track in accordance with an embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, a haptic effect is automatically generated in response to received input media that can include audio data or video data, and may include sensory data for one or more objects in a scene. The result is an automated haptic effect track that may include a plurality of clips or scenes.

At 704, the selection of one or more types of tuning or filtering for the automatically generated haptic effect track is received. In one embodiment, the available filters include "emphasize bumps", "emphasize last", "scenes blending", "dynamic range compression/expansion", "actuator capability", "object of interest", "background/foreground" and "proximity to action" filters.

At 706, the automated generated haptic effect track is filtered based on the selection or selections at 704, and the final filtered haptic effect track is generated.

As disclosed, a haptic effect track is automatically generated. This baseline haptic effect track is then tuned or filtered based on a selection of one or more tuning preferences. The resultant haptic effect track is consequently adapted to a user's preference.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects, comprising:
   receiving input media comprising at least one of audio data, video data, or sensory data;
   automatically generating a haptic effect track from the input media to generate an automatically generated haptic effect track by converting the input media to haptic effect parameters, the converting the input media to haptic effect parameters comprising converting the audio data into the haptic effect parameters, the haptic effect parameters comprising at least a magnitude, and the haptic effect parameters being adapted to generate a haptic effect when applied to a haptic effect playback device; and
   applying selectable filters to the automatically generated haptic effect track to generate a tuned haptic effect track by using a first tuned haptic effect track output from a first selectable filter of the selectable filters and a second tuned haptic effect track output from a second selectable filter of the selectable filters as input into a summation filter, the summation filter including a weighted sum scheme where a weight of each input can be user-assigned or assigned automatically,
   wherein the selectable filters each modify at least one of the haptic effect parameters of the automatically generated haptic effect track.

2. The method of claim 1, wherein one of the selectable filters modifies at least one of the haptic effect parameters to emphasize bumps in the automatically generated haptic effect track.

3. The method of claim 1, wherein one of the selectable filters modifies at least one of the haptic effect parameters to emphasize a last effect in one or more clips of the automatically generated haptic effect track.

4. The method of claim 1, wherein one of the selectable filters modifies at least one of the haptic effect parameters between scenes of the automatically generated haptic effect track.

5. The method of claim 1, wherein one of the selectable filters modifies at least one of the haptic effect parameters to highlight transitions between scenes of the automatically generated haptic effect track.

6. The method of claim 1, wherein one of the selectable filters modifies at least one of the haptic effect parameters to make weak haptic effects of the automatically generated haptic effect track weaker or to make strong haptic effects of the automatically generated haptic effect track stronger.

7. The method of claim 1, wherein one of the selectable filters modifies at least one of the haptic effect parameters of the automatically generated haptic effect track in response to haptic output capabilities of the haptic effect playback device.

8. The method of claim 1, wherein the input media comprises video data, and one of the selectable filters modifies at least one of the haptic effect parameters of the automatically generated haptic effect track to emphasize a selected object or event.

9. The method of claim 1, wherein the input media comprises video data, and one of the selectable filters modifies at least one of the haptic effect parameters of the automatically generated haptic effect track to emphasize a background or a foreground object or background or foreground events.

10. The method of claim 1, wherein the input media comprises video data, and one of the selectable filters modifies at least one of the haptic effect parameters of the automatically generated haptic effect track to emphasize proximity to action in the input media.

11. The method of claim 1, wherein a third selectable filter of the selectable filters is applied in parallel to at least one of the first and second selectable filters.

12. The method of claim 1, wherein a first modified haptic effect parameter is magnitude.

13. The method of claim 12, wherein an order of applying the selectable filters is based on a predefined priority.

14. A non-transitory computer readable medium having instructions stored thereon that, when executed by a processor, cause the processor to generate haptic effects, the generating haptic effects comprising:
receiving input media comprising at least one of audio data, video data, or sensory data;
automatically generating a haptic effect track from the input media to generate an automatically generated haptic effect track by converting the input media to haptic effect parameters, the converting the input media to haptic effect parameters comprising converting the audio data into the haptic effect parameters, the haptic effect parameters comprising at least a magnitude, and the haptic effect parameters being adapted to generate a haptic effect when applied to a haptic effect playback device; and
applying selectable filters to the automatically generated haptic effect track to generate a tuned haptic effect track by using a first tuned haptic effect track output from a first selectable filter of the selectable filters and a second tuned haptic effect track output from a second selectable filter of the selectable filters as input into a summation filter, the summation filter including a weighted sum scheme where a weight of each input can be user-assigned or assigned automatically,
wherein the selectable filters each modify at least one of the haptic effect parameters of the automatically generated haptic effect track.

15. The non-transitory computer readable medium of claim 14, wherein one of the selectable filters modifies at least one of the haptic effect parameters to emphasize bumps in the automatically generated haptic effect track.

16. The non-transitory computer readable medium of claim 14, wherein one of the selectable filters modifies at least one of the haptic effect parameters to emphasize a last effect in one or more clips of the automatically generated haptic effect track.

17. The non-transitory computer readable medium of claim 14, wherein one of the selectable filters modifies at least one of the haptic effect parameters between scenes of the automatically generated haptic effect track.

18. The non-transitory computer readable medium of claim 14, wherein one of the selectable filters modifies at least one of the haptic effect parameters to highlight transitions between scenes of the automatically generated haptic effect track.

19. The non-transitory computer readable medium of claim 14, wherein one of the selectable filters modifies at least one of the haptic effect parameters to make weak haptic effects of the automatically generated haptic effect track weaker or to make strong haptic effects of the automatically generated haptic effect track stronger.

20. The non-transitory computer readable medium of claim 14, wherein one of the selectable filters modifies at least one of the haptic effect parameters of the automatically generated haptic effect track in response to haptic output capabilities of the haptic effect playback device.

21. The non-transitory computer readable medium of claim 14, wherein the input media comprises video data, and one of the selectable filters modifies at least one of the haptic effect parameters of the automatically generated haptic effect track to emphasize a selected object or event.

22. The non-transitory computer readable medium of claim 14, wherein the input media comprises video data, and one of the selectable filters modifies at least one of the haptic effect parameters of the automatically generated haptic effect track to emphasize a background or a foreground object or background or foreground events.

23. The non-transitory computer readable medium of claim 14, wherein the input media comprises video data, and one of the selectable filters modifies at least one of the haptic effect parameters to emphasize proximity to action in the media.

24. The non-transitory computer readable medium of claim 14, wherein a third selectable filter of the selectable filters is applied in parallel to at least one of the first and second selectable filters.

25. A haptic effect generation system comprising:
a conversion module that receives input media comprising at least one of audio data, video data, or sensory data, and automatically generates a haptic effect track from the input media to generate an automatically generated haptic effect track by converting the input media to haptic effect parameters, the converting input media to haptic effect parameters comprising converting the audio data into the haptic effect parameters, the haptic effect parameters comprising at least a magnitude, and the haptic effect parameters being adapted to generate a haptic effect when applied to a haptic effect playback device; and
a filtering module that applies selectable filters to the automatically generated haptic effect track to generate a tuned haptic effect track by using a first tuned haptic effect track output from a first selectable filter of the selectable filters and a second tuned haptic effect track output from a second selectable filter of the selectable filters as input into a summation filter, the summation filter including a weighted sum scheme where a weight of each input can be user-assigned or assigned automatically,
wherein the selectable filters each modify at least one of the haptic effect parameters of the automatically generated haptic effect track.

26. The system of claim 25, wherein a third selectable filter of the selectable filters is applied in parallel to at least one of the first and second selectable filters.

\* \* \* \* \*